July 22, 1958 F. PAVESI 2,844,002
HYDRAULIC PISTON PUMP, PARTICULARLY SUITABLE
FOR DIFFERENTIAL HYDRAULIC TRANSMISSIONS
Filed May 8, 1953 3 Sheets-Sheet 1

INVENTOR.
FRANCO PAVESI

July 22, 1958 F. PAVESI 2,844,002
HYDRAULIC PISTON PUMP, PARTICULARLY SUITABLE
FOR DIFFERENTIAL HYDRAULIC TRANSMISSIONS
Filed May 8, 1953 3 Sheets-Sheet 2

INVENTOR.
FRANCO PAVESI

INVENTOR:
FRANCO PAVESI

United States Patent Office 2,844,002
Patented July 22, 1958

2,844,002
HYDRAULIC PISTON PUMP, PARTICULARLY SUITABLE FOR DIFFERENTIAL HYDRAULIC TRANSMISSIONS

Franco Pavesi, Milan, Italy
Application May 8, 1953, Serial No. 353,850
Claims priority, application Italy May 13, 1952
2 Claims. (Cl. 60—53)

The present invention relates to a piston pump and motor hydraulic transmission of the wobble and swash plate type.

It is a primary object of this invention to provide means conducive to a highly economical hydraulic transmission pump structure which is very compact and operates with a minimum of friction between its movable parts.

It is another object of this invention to provide means leading to a highly precise and reliable synchronization of valve control and operation within a pump and motor hydraulic transmission of the aforesaid type.

It is yet another object of this invention to provide means affording a highly simplified, differential regulation of transmission ratios within a pump of the type herein referred to.

The pump according to the present invention is further characterised by the fact that it comprises a distributor unit constituted by substantially radially arranged valves, driven by an eccentric in one direction and recalled in the other direction by a cylindrical return or recall element which is free to turn around the axis of said eccentric. The distributing valves put their relative pump cylinders alternately in communication with two substantially annularly shaped chambers having different diameters from each other, but grouped about a common axis, constituting respectively the suction and delivery conduits of said pump.

The above and other objects will ensue from the description of the invention reference being had to the annexed somewhat schematic drawings, which are only explicative and not limitative of the scope of the invention, wherein.

Figure 1:
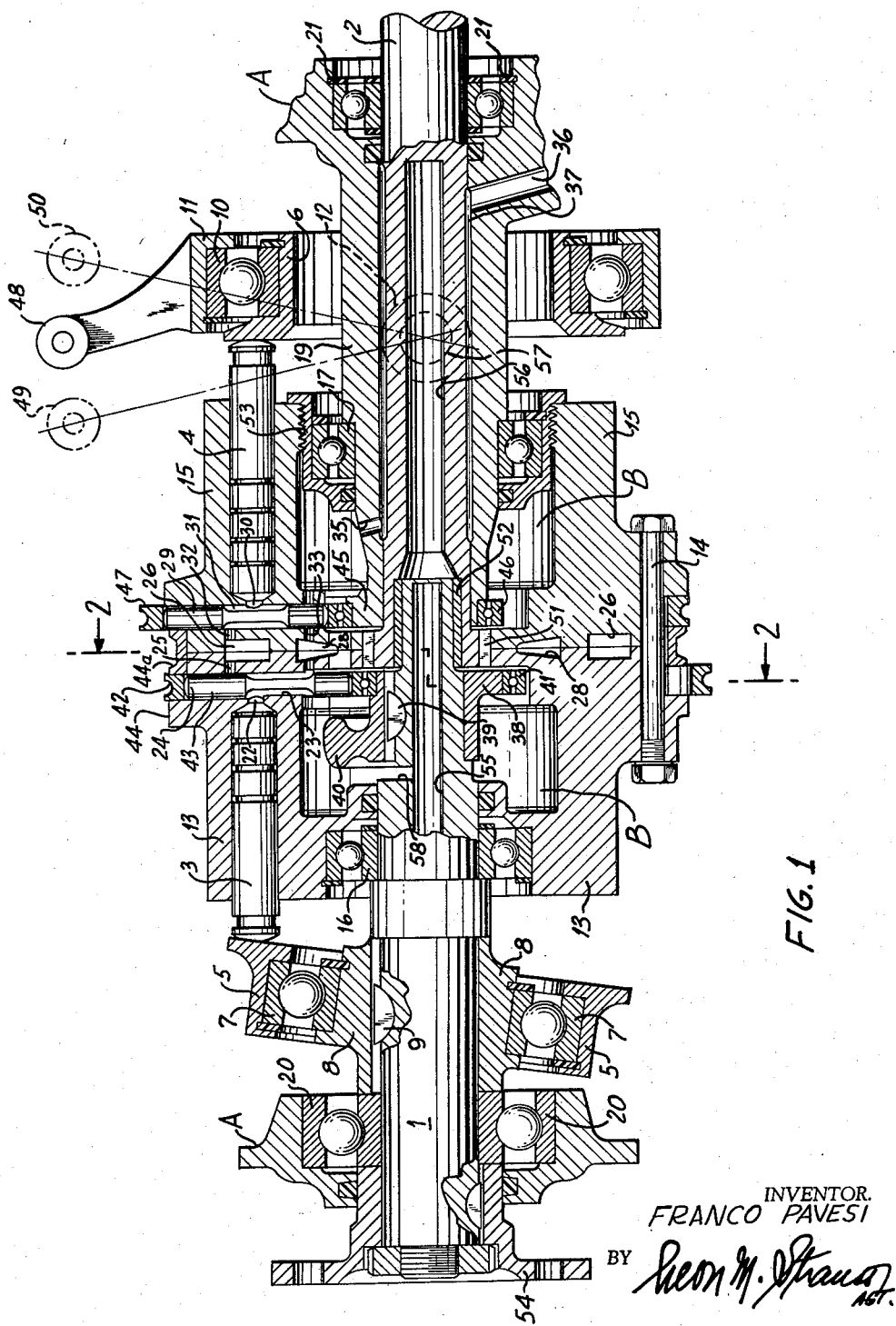
Fig. 1 shows in a longitudinal section a differential hydraulic transmission apparatus comprising a pump and motor according to the invention.
Figure 2:
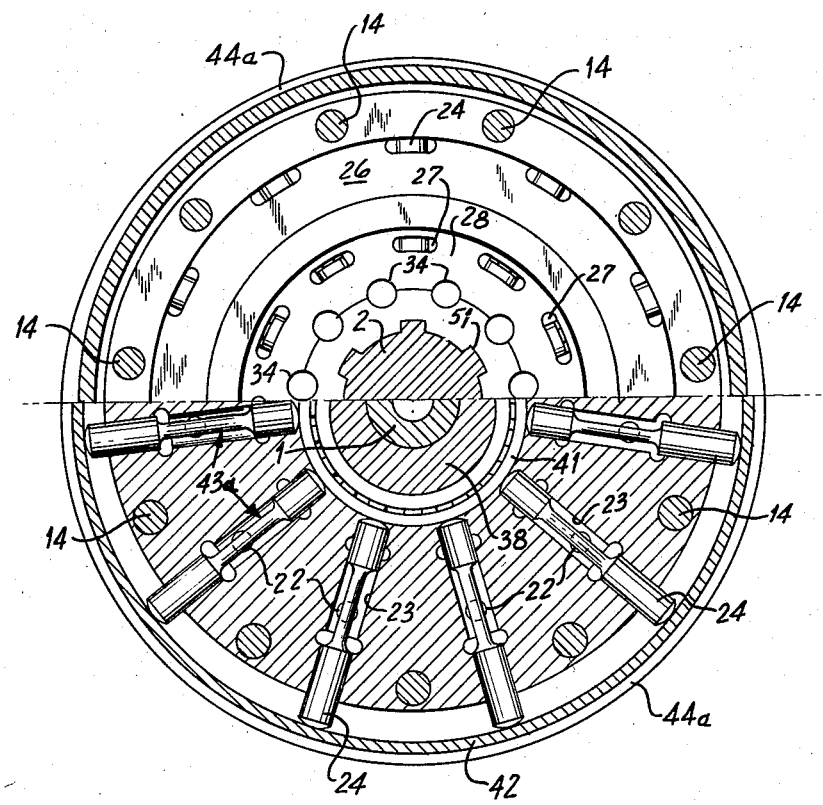
Fig. 2 is a cross section of the same along line II—II of Fig. 1.

Referring to Figs. 1 and 2, the hydraulic transmission apparatus herein disclosed is of the differential type, having two co-axial shafts 1 and 2. Input shaft 1 of the pump unit drives axial reciprocating pistons 3 of the pump cylinders in pump cylinder block 13 (only one of the pistons of each pump is shown in Fig. 1) through ring 5. Ring 5 is co-axial with shafts 1 and 2 and inclined in respect to the axis of said shafts; output shaft 2 is driven by the reciprocating pistons in pump block 13 and motor block 15 directly.

Ring 5 is supported by the outer race of a ball bearing 7 carried by a wobble plate 8 fastened by key 9 to input shaft 1, so that ring 5 gyrates about the axis of shaft 1.

Swash plate 6 driving reciprocating pistons 4 in the motor unit is connected through a ball bearing 10 to a second ring 11 which can oscillate around an axis at right angles to the axis of shaft 2. The oscillating pin 12 is pivotally carried by stationary sleeve 19 of body A. In Fig. 1 the swash plate 6 is in a position of no delivery, the swash plate being at right angles to the axis of shaft 2.

The pump cylinder block 13 of the pump unit is rigidly connected through bolts 14 to the motor cylinder block 15 of the motor unit with their respective valve blocks therebetween. The two cylinder blocks 13 and 15 are supported by ball bearing 16 of shaft 1 and bearing 17 on the sleeve element 19 which is integral with body A. The cylinder blocks can then revolve around the common axis of the two shafts 1 and 2. The latter are supported by the body A respectively by ball bearings 20 and 21.

Each of the cylinders in pump block 13 has an end conduit 22 communicating with a radial cylindrical hole 23 within which there slides a cylindrical distributing valve 43. Holes 23 communicate externally, through ports 25, with an annular chamber 26, and internally through ports 27 with a second annular chamber 28.

Each valve 43 comprises a pair of spherical heads having a common center disposed along the valve axis. Intermediate the heads, a portion of the valve is reduced to provide a zone 43a for receiving fluid.

The distributiong valves 43 are so dimensioned that when the valve is at the end of its inward travel toward the axis, hole 22 of the corresponding cylinder communicates with annular chamber 28 through port 27. When valve 43 is at the end of its outward travel, the hole 22 of its respective cylinder communicates through port 25 with annular chamber 26. The two annular chambers 26 and 28 are co-axial with the axis common to shafts 1 and 2. Analagous cylindrical distributing valves 29 are employed in the motor unit. Each cylinder of the motor unit has an end conduit 30 communicating with a radial cylindrical hole 31 in which the fluid-tight distributing valve 29 slides. Hole 31 communicates externally through port 32 with annular chamber 26, and internally through port 33 with annular chamber 28. Consequently, chambers 26 and 28 are defined between the pair of valve blocks.

Annular chamber 26 receives the fluid under pressure, whereas annular chamber 28 receives the fluid under suction and communicates through holes 34 (shown in Fig. 2) with internal chamber B of the cylinder groups. The suction conduit 36 communicates with the annular chamber 37 comprised between sleeve element 19 and shaft 2. Chamber 37 communicates with chamber B via radial holes 35 in sleeve element 19.

The movement of the pump unit distributing valves must, naturally, be synchronized with the movement of their respective pistons 3. This is accomplished, by means of a radial cam ring 38 coupled with shaft 1, to which shaft the wobble plate 8 and ring 5 driving pistons 3 are rigidly connected. The cam ring 38 is eccentrically mounted on shaft 1 by means of key 39 and is provided with a counterweight 40. The eccentric cam ring 38 controls the inside end of valve 43 by means of a race of a ball or similar anti-friction bearing 41 that eliminates the friction between the eccentric cam ring and valve 43. The eccentric cam ring 38 operates the valves centrifugally whereas a centripetal recalling action upon the valves is obtained by means of an external return or recall ring 42.

The return or recall ring 42 is axially guided between shoulders 44 and 44a, the latter being constituted by an annular element fixed to the cylinder blocks 15 and 13.

The return or recall ring 42 is then free to revolve around its own axis and to displace itself within a plane at right angles to the common axis of shafts 1 and 2.

The position of the return or recall ring 42 is at all times defined by the position of the eccentric cam ring 38. The reciprocal radial position of the valve 29 determines the position of recall ring 42 acting on the ends 24 of the valves themselves. The radial length of the valves is equal to the difference between the radii of the active cylindrical surfaces of the eccentric cam ring 38 and the recall ring 42. The recalling action exerted by ring 42 is, substantially, transmitted via the valves 43 in the phase of centrifugal motion by the same eccentric cam ring 38. The liberty of movement permitted by ring 42 results in the elimination of friction between the ring itself and valve 43.

An analogous constructional solution is used for the motor unit. An eccentric 45, integral with sleeve element 19 of body A, operates valve 29 by means of ball bearing 46. An external recall ring 47 provides a centripetal recalling action. Eccentric 45 must, obviously, be fixed with respect to body A because its eccentricity is determined with respect to the setting of the axis of oscillation of ring 11 which drives pistons 4. The setting of ring 11 and therefore the value of delivery of the motor unit is regulated in a known manner by the operation of control lever 48. The extreme positions 49 and 50 of control lever 48 are indicated by dotted lines.

It is a known fact that the variation of the delivery of the motor unit permits the transmission ratio between shafts 1 and 2 to be varied.

Shaft 2 is torsionally connected to the cylinder blocks 13 and 15 by means of the radial claw coupling 51 at the center of the blocks between eccentrics 38 and 45. The inner ends of shafts 1 and 2 cooperate through a bushing 52. To facilitate mounting, ball bearing 17 is supported by a threaded ring 53 fastened to the cylinder block 15. Motion is transmitted to shaft 1 by means of a flange 54 keyed onto the shaft itself. It is understood that the apparatus might comprise two pump units in order to have a fixed and pre-established transmission ratio, or motor units in order to realize all the desired transmission ratios. Chamber B also communicates with the suction conduit 36 through the axial holes 55 and 56 of shaft 1 and 2 by means of radial holes 57 of shaft 2 and 58 of shaft 1.

Figure 3:
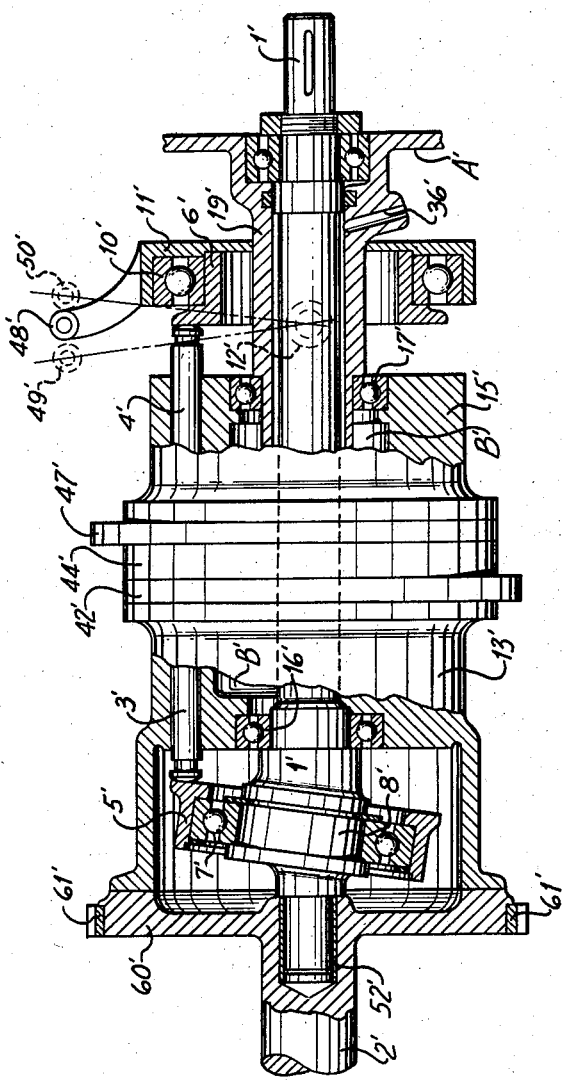
Fig. 3 illustrates in a partial longitudinal section a differential hydraulic transmission apparatus according to a constructional variant.

Another embodiment of the invention is shown in Fig. 3. The parts shown in Fig. 3 which correspond to the parts shown in Fig. 1 are given the same reference numbers with prime marks being added. For example 1' of Fig. 3 corresponds to 1 of Fig. 1, 2' of Fig. 3 corresponds to 2 of Fig. 1, etc. Cylinder blocks 13' and 15' are connected to flange 60' which is integral with shaft 2'. Shaft 1' carrying ring 5' relative to the pump unit traverses the cylinder blocks and extends at a side opposite to shaft 1 of Fig. 1. The cylinders in blocks 13' and 15' are then driven from outside instead of from inside as in Fig. 1. Shaft 2' secured to the cylinder blocks extends from the side opposite to shaft 2 of the preceding embodiment shown in Fig. 1. In the embodiment shown in Fig. 3 when the apparatus is to be driven by automobile engine, the flywheel of the internal combustion engine can be constituted by the same flange 60', in which case a toothed crown 61' for the starting motor is arranged on flange 60'.

The hydraulic piston pump as disclosed heretofore may be operated with variable capacity. By a simple regulation of the handle 48 the capacity of the motor unit can be selectively varied. The positions of the pistons in the motor unit are defined by the positions of the handle 48 so that the capacity of the motor unit can be subjected to precise variation. The variations in the capacity of the motor unit in turn produce corresponding variations in the transmission ratios between the input and output shafts.

In practice the constructional particulars of the hydraulic transmission apparatus may be varied without departing from the spirit and scope of the present invention.

Having thus described the invention, what is claimed as new and desired to be secured by Letters Patent is:

1. In a hydraulic piston pump having a rotatable shaft, a cylinder block disposed about said shaft, said block being provided with a plurality of cylinders and with a plurality of pistons reciprocally displaceable therein, said shaft carrying wobble plate means inclined relative to the axis of said shaft and successively engageable with said pistons to reciprocate the same sequentially upon rotation of said shaft; a valve block connected with said cylinder block, said valve block being provided with a plurality of circumferentially spaced holes extending radially of said shaft and with a pair of spaced annular chambers disposed concentrically about said shaft, said holes communicating with said cylinders, respectively, and with said spaced chambers, the point of communication of each hole with its respective cylinder lying intermediate its points of communication with said chambers, a valve disposed within each hole for reciprocal movement therein radially of said shaft and provided with a reduced portion intermediate a pair of ends, said valves selectively sealing off the communication between said holes and one of said chambers, respectively, a cam ring arranged eccentrically on said shaft and operatively and successively contacting the adjacent ends of said valves as said shaft rotates relative to said valve block, a recall ring disposed about said shaft and spaced therefrom, said recall ring operatively contacting the other ends of said valves, said cam ring and said recall ring being spaced from each other by the length of each valve, whereby said reciprocal movements of said valves within said holes are governed by said cam ring and said recall ring.

2. In a hydraulic piston pump having a rotatable shaft, a cylinder block disposed about said shaft, said block being provided with a plurality of circumferentially spaced cylinders, and with a plurality of pistons reciprocally displaceable within said cylinders, respectively, said shaft carrying wobble plate means inclined relative to the axis of said shaft and successively engageable with said pistons to reciprocate the same upon rotation of said shaft; a valve block connected with said cylinder block, said valve block being provided with a plurality of circumferentially spaced holes extending radially of said shaft and with a pair of spaced annular chambers disposed concentrically about said shaft, each of said holes communicating with a respective cylinder and with said spaced chambers, the point of communication of each hole with its respective cylinder lying intermediate its points of communication with said chambers, respectively, a plurality of valves disposed within said holes, respectively, for reciprocal movement radially of said shaft and each provided with a reduced portion intermediate a pair of spherical ends having a common center disposed along the axis of the respective valve, each of said valves sealing off the communication between its respective hole and one of said chambers, selectively, anti-friction bearing means about said shaft and including an inner race and an outer race, a rotatable cam ring arranged eccentrically on said shaft and operatively contacting said inner race, one end of each of said valves contacting said outer race, and a circular recall ring operatively contacting the other end of each of said valves and disposed concentrically with said cam ring, whereby said valves are positively guided for said reciprocal movement within said holes, respectively, by contact with said recall ring and with said outer race of said bearing means under the action of said cam ring as the same rotates with said shaft.

References Cited in the file of this patent
UNITED STATES PATENTS

| | | |
|---|---|---|
| 1,971,601 | Dilg | Aug. 28, 1934 |
| 1,998,004 | Ernst | Apr. 16, 1935 |
| 2,232,984 | Wahlmark | Feb. 25, 1941 |
| 2,348,958 | Celio | May 16, 1944 |
| 2,441,797 | Carnahan | May 18, 1948 |
| 2,504,041 | Orshansky | Apr. 11, 1950 |
| 2,612,753 | Bevins | Oct. 7, 1952 |
| 2,633,710 | Jarmann | Apr. 7, 1953 |